United States Patent
Kim

(10) Patent No.: US 8,456,452 B2
(45) Date of Patent: Jun. 4, 2013

(54) OPTICAL PEN MOUSE CAPABLE OF MAGNIFYING DISPLAYED OBJECT AND METHOD OF MAGNIFYING DISPLAYED OBJECT USING THE SAME

(75) Inventor: Myeong Ho Kim, Bucheon-si (KR)

(73) Assignee: ISV Co., Ltd., Bucheon-Si (KR)

( * ) Notice: Subject to any disclaimer, the term of this patent is extended or adjusted under 35 U.S.C. 154(b) by 523 days.

(21) Appl. No.: 12/526,417

(22) PCT Filed: Jan. 28, 2008

(86) PCT No.: PCT/KR2008/000498
§ 371 (c)(1),
(2), (4) Date: Oct. 29, 2010

(87) PCT Pub. No.: WO2008/096973
PCT Pub. Date: Aug. 14, 2008

(65) Prior Publication Data
US 2011/0037699 A1    Feb. 17, 2011

(30) Foreign Application Priority Data
Feb. 8, 2007    (KR) .................. 10-2007-0012978

(51) Int. Cl.
*G09G 5/00*    (2006.01)
(52) U.S. Cl.
USPC .......................................... 345/179; 345/166
(58) Field of Classification Search
USPC ....... 345/166, 179, 180, 182, 183; 178/19.01, 178/19.05; 715/815; 348/114
See application file for complete search history.

(56) References Cited

U.S. PATENT DOCUMENTS 6,137,469 A * 10/2000 Wu et al. .................. 345/660
7,327,932 B2 * 2/2008 Ozawa et al. .............. 386/353

FOREIGN PATENT DOCUMENTS

| JP | 02-242321 A | 9/1990 |
| JP | 04119418 A | 4/1992 |
| JP | 05-158613 A | 6/1993 |
| KR | 2006071353 | 6/2006 |

OTHER PUBLICATIONS

International Search Report for International Application No. PCT/KR2008/000498, 2 pages.

* cited by examiner

*Primary Examiner* — Abbas Abdulselam
(74) *Attorney, Agent, or Firm* — Lando & Anastasi, LLP

(57) ABSTRACT

Disclosed herein are an optical pen mouse capable of magnifying a displayed object and a method of magnifying a displayed object using the same. The optical pen mouse includes a magnification setting unit and a microcomputer. The magnification setting unit inputs a magnification (M) so as to adjust a size of an object to be displayed on the monitor of a computer. The microcomputer calculates input coordinate values (X,Y) (a horizontal coordinate value, a vertical coordinate value) based on an electrical signal from the light receiving unit, and, when the magnification (M) is received from the magnification setting unit, calculates display coordinate values (X',Y') based on the input coordinate values (X,Y) and the magnification (M), converts the calculated display coordinate values (X',Y') into a coordinate data code, and outputs the coordinate data code.

9 Claims, 5 Drawing Sheets

(a)

(b)

(c)

OPTICAL PEN MOUSE CAPABLE OF MAGNIFYING DISPLAYED OBJECT AND METHOD OF MAGNIFYING DISPLAYED OBJECT USING THE SAME

TECHNICAL FIELD

The present invention relates, in general, to an optical pen mouse, and, more particularly, to an optical pen mouse capable of magnifying a displayed object and a method of magnifying a displayed object using the same, which enable a user to adjust the size of an object displayed on a monitor, and which are appropriate for minimizing error because they calculate display coordinate values (X',Y') based on the addition of remainders, obtained through the division of input coordinate values $(X_n,Y_n)$ (n: a natural number equal to or greater than I; hereinafter used to have this meaning) by magnification M, to subsequent input coordinate values $(X_{n+1},Y_{n+1})$ and the division of the resulting values of the addition by the magnification M.

BACKGROUND

Generally, a mouse for a computer is chiefly used to execute or control an application program, and is an input device that is essentially used in most Graphic User Interface (GUI)-oriented computer systems.

Meanwhile, such a mouse has a problem in that its precision is insufficient in the case where it is used to directly fabricate or create figures or characters in a specific application program.

A mouse that has overcome the problem with the prior art mouse is an optical pen mouse. FIG. 1 is a conceptual diagram of the prior art optical pen mouse.

The prior art optical pen mouse has a pen shape, so that it does not cause fatigue even upon long-term use thereof, it is convenient to carry, it can be easily used in a small space, and it has superior ability to be used for precise tasks or writing cursive script.

As is well known, a typical optical pen mouse includes a light emitting unit, which is implemented using a Light Emitting Diode (LED) or the like, and is configured to emit light; a light receiving unit, which is implemented using an image sensor and a focusing lens, and is configured to receive light formed when the light emitted from the light emitting unit is reflected from the reflecting surface, convert the light into an electrical signal, and output the electrical signal; a contact sensing unit, which is implemented using a pressure sensor, and is configured to sense pressure attributable to contact with a bottom surface (that is, a reflecting surface), input information about selection and execution of an icon through a press (a click on the left button of a typical mouse) and a double press (a double click on the left button of a typical mouse), and input figures or characters through a click-and-drag operation; and a microcomputer, which is configured to calculate changing plane coordinate values (that is, coordinate values (X,Y)) based on an electrical signal from the light receiving unit and transmit the calculated coordinate values to a computer body (not shown) through a transmission unit.

FIG. 10 is a conceptual diagram illustrating the problem with the prior art optical pen mouse.

As shown in FIG. 10, the prior art optical pen mouse has a problem in which a value output based on an input value is excessively large or small (in particular, an excessively large value poses the biggest problem).

First, a technology for adjusting the size of a displayed object by adjusting the speed of a mouse in such a way as to implement a function of adjusting the speed of a mouse in system software such as Windows and realize the setting of slow/fast speeds has been proposed.

However, this technology has problems in that setting is very difficult and precision is low because the technology requires different setting whenever a character is input (that is, speed is set, writing is performed, setting is made, writing is performed, and so forth).

Second, there is a technology for adjusting the size of an object by providing separate application software for readjusting the size of data input from a mouse and running the application software for adjusting the size of data.

However, in the case in which such separate application software is used, there are problems in that compatibility with system software poor, the cost of equipment is high and the precision of the equipment is low.

SUMMARY OF INVENTION

Accordingly, the present invention has been made keeping in mind the above problems occurring in the prior art, and an object of the present invention is to provide an optical pen mouse capable of magnifying a displayed object and a method of magnifying a displayed object using the optical pen mouse, which enable a user to adjust the size of an object displayed on a monitor, with the results that, first, the user can display an object at a desired size, even though the size of the displayed object varies with the computer or the application program used by the user, second, the user can freely set the difference between the size of a moving trajectory and the size of an object displayed on a monitor, third, the user can display an object at a specific size regardless of writing habits, fourth, the present invention enables the user to represent an object at a level similar to the level of the sensation of drawing an object on paper using an actual pen, and, fifth, the present invention calculates display coordinate values (X',Y') based on the addition of remainders, obtained through the division of the input coordinate values $(X_n,Y_n)$ by the magnification (M), to subsequent input coordinate values $(X_{n+1},Y_{n+})$ and the division of the resulting value of the addition by the magnification (M), thereby minimizing errors.

In order to accomplish the above objects, the present invention provides an optical pen mouse capable of magnifying a displayed object, including a magnification setting unit for inputting a magnification (M) so as to adjust a size of an object to be displayed on the monitor of a computer; and a microcomputer for calculating input coordinate values (X,Y) (a horizontal coordinate value, a vertical coordinate value) based on an electrical signal from the light receiving unit, and, when the magnification (M) is received from the magnification setting unit, calculating display coordinate values (X',Y') based on the input coordinate values (X,Y) and the magnification (M), converting the calculated display coordinate values (X',Y') into a coordinate data code, and outputting the coordinate data code.

In order to accomplish the above objects, the present invention provides a method of magnifying a displayed object using an optical pen mouse, including a step of calculating input coordinate values (X,Y) based on a received electrical signal; a step of determining whether magnification (M) has been received from a magnification setting unit: a step of, if the magnification M has been received, calculating display coordinate values (X',Y') based on the input coordinate values (X,Y) and the magnification (M); a step of converting the calculated display coordinate values (X',Y') into a step code;

and a step of transmitting the step code of the display coordinate values (X',Y') to a computer body through a transmission unit.

The method further includes a step of converting the input coordinate values (X,Y) into a step code if, as a result of the determination at the step, the magnification (M) has not been received.

In the method, the calculation of the display coordinate values (X',Y') is performed in such a way as to add remainders, obtained through division of the input coordinate values $(X_n,Y_n)$ by the magnification (M), to subsequent input coordinate values $(X_{n+1},Y_{n+1})$ and divide a resulting value by the magnification (M).

In the method, the step of calculating the display coordinate values (X',Y') includes a step of determining whether the input coordinate values are initial input coordinate values $(X_1,Y_1)$; a step of, if the input coordinate values are initial input coordinate values $(X_1,Y_1)$, calculating initial display coordinate values $(X_1',Y_1')$; a step (S714) of adding remainders $(A_n,B_n)$, obtained through calculation by the initial display coordinate values $(X_1',Y_1')$, to the obtained input coordinate values $(X_{n+1},Y_{n+1})$; a step (S716) of dividing addition data $(X_{n+1}+A_n,Y_{n+1}+B_n)$, obtained by the addition, by the magnification (M); a step (S718) of setting quotients, obtained through the division, as the display coordinate values $(X_{n+1}',Y_{n+1}')$; a step (S720) of determining whether n has reached N (a last coordinate number); and a step of, if n has reached N, transmitting remainders $(A_1, B_1)$, obtained through the division, to the addition step, and repeating the steps (S714 to S718) until n has reached N.

In the method, the step of calculating the initial display coordinate values $(X_1',Y_1')$ includes a step of dividing the initial input coordinate values $(X_1,Y_1)$ by the magnification (M); a step of setting quotients, obtained through the division, as the initial display coordinate values $(X_1',Y_1')$; and a step of transmitting remainders $(A_1,B_1)$, obtained through the division, to a step of calculating second display coordinate values $(X_2',Y_2')$.

The optical pen mouse capable of magnifying a displayed object and a method of magnifying a displayed object using the optical pen mouse according to the present invention, which have the above-described construction and process, have the following operational effects.

The optical pen mouse and the method enable a user to adjust the size of an object displayed on a monitor, so they have operational effects in that, first, the user can display an object at a desired size, even though the size of the displayed object varies with the computer or the application program used by the user, second, the user can freely set the difference between the size of a moving trajectory and the size of an object displayed on a monitor, third, the user can display an object at a specific size regardless of writing habits, fourth, the present invention enables the user to represent an object at a level similar to the level of the sensation of drawing an object on paper using an actual pen, and, fifth, the present invention calculates display coordinate values (X',Y') based on the addition of remainders, obtained through the division of the input coordinate values $(X_n,Y_n)$ by the magnification (M), to subsequent input coordinate values $(X_{n+1},Y_{n+1})$ and the division of the resulting value of the addition by the magnification (M), thereby minimizing errors.

DETAILED DESCRIPTION

Preferred embodiments of an optical pen mouse capable of magnifying a displayed object and a method of magnifying a displayed object using the optical pen mouse according to the present invention will be described in detail below with reference to the accompanying drawings.

Figure 1:
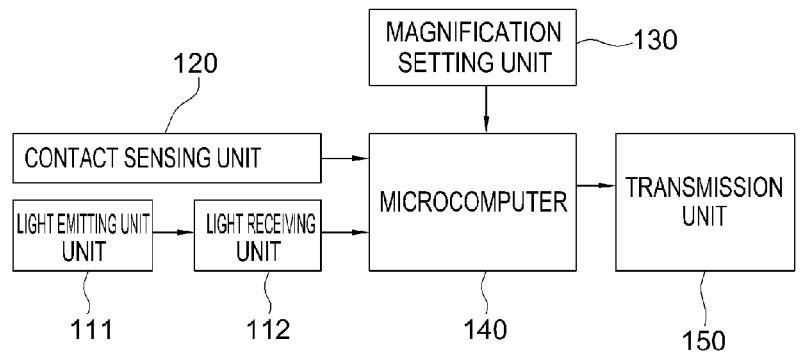
FIG. 1 is a block diagram of an optical pen mouse according to an embodiment of the present invention.
Figure 9:
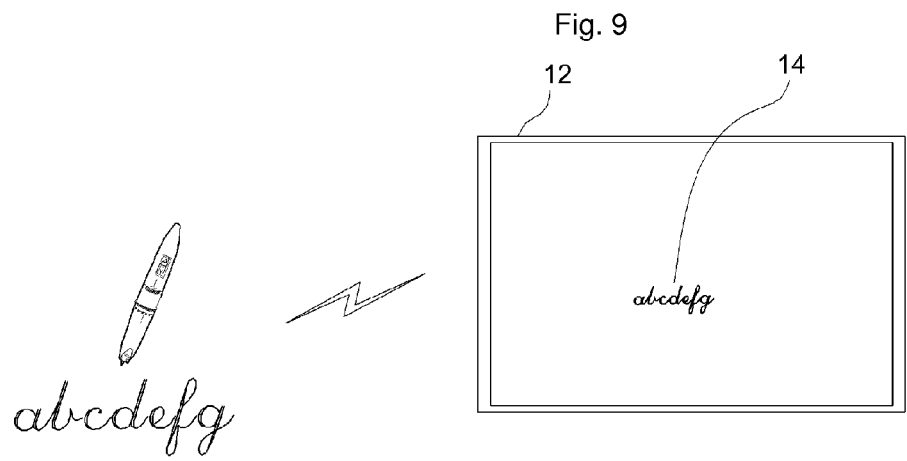
FIG. 9 is a conceptual diagram showing the case where the size of a displayed object is adjusted according to the present invention.
Figure 10:
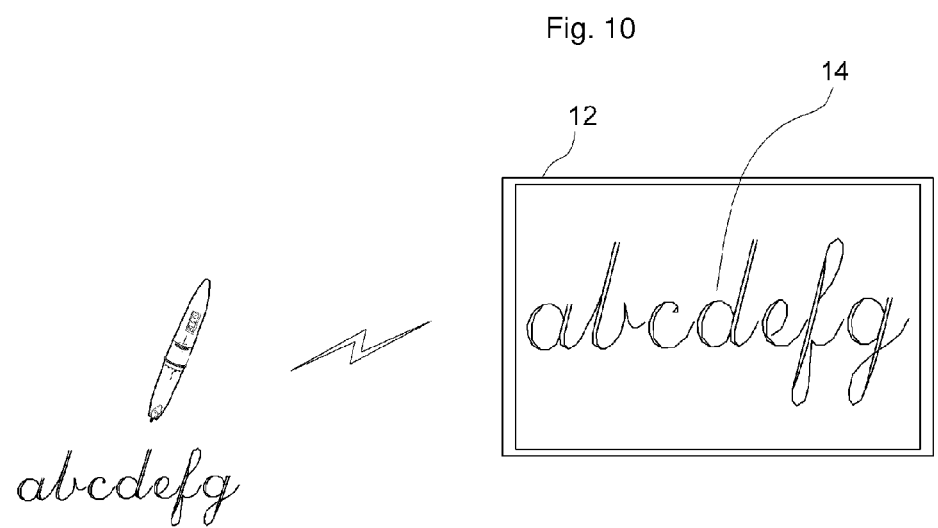
FIG. 10 is a conceptual diagram illustrating the problem with a prior art optical pen mouse.

FIG. 1 is a block diagram of an optical pen mouse according to an embodiment of the present invention, and FIG. 9 is a conceptual diagram showing a case where the size of a displayed object is adjusted according to the present invention.

As shown in FIG. 1, the optical pen mouse capable of magnifying a displayed object according to an embodiment of the present invention includes a light emitting unit 111, a light receiving unit 112, a contact sensing unit 120, a microcomputer 140, a transmission unit 150 and a magnification setting unit 130.

The light emitting unit 111, the light receiving unit 112, the contact sensing unit 120, the button input unit (not shown) and the transmission unit 150 were well known to those skilled in the art before the submission of the patent application of the present invention. In brief, the light emitting unit 111 includes a light source implemented using a Light Emitting Diode (LED) or the like, the light receiving unit 112 includes an image sensor, so that it converts optical signals into electrical signals and outputs the electrical signals, the contact sensing unit 120 includes a pressure transfer unit and a pressure sensor, so that it detects contact with a reflecting surface for reflecting light and outputs a sensing signal to the microcomputer 140, and the button input unit performs functions corresponding to those of the right and left buttons of a typical mouse.

The magnification setting unit 130 is a user interface through which magnification M is input in order to magnify an object 14 (a general term for data output to a monitor, such as a character and a figure) displayed on the monitor 12 of a computer.

Figure 5:
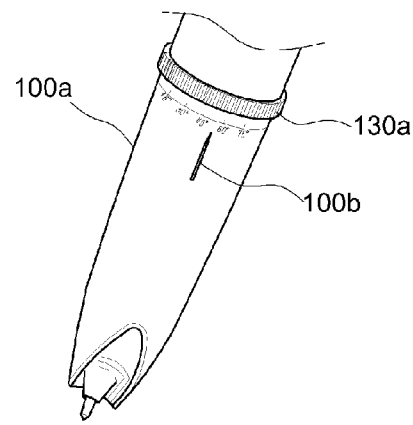
FIG. 5 is diagrams showing examples of the magnification setting unit of FIG. 1.
Figure 5:
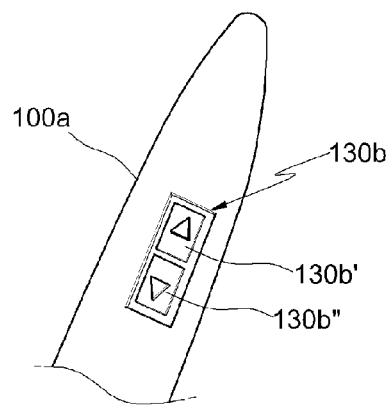
Figure 5:
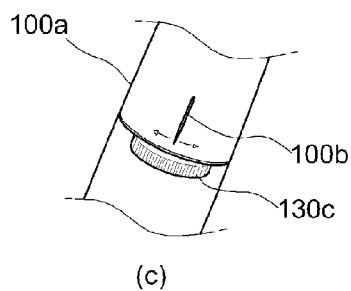

FIG. 5 is diagrams showing examples of the magnification setting unit 130.

As shown in FIG. 5, the magnification setting unit 130 may be implemented using any of a rotary switch 130a (FIG. 4(a)), a selection switch 130b (FIG. 4(b)) and a volume switch 130c (FIG. 4(c)), which is disposed in the body 100a of the pen mouse to be exposed outside, and is configured to input magnification M.

The rotary switch 130a is disposed in the body 100a of the pen mouse to be exposed outside, and inputs magnification M through rotation around a center line 100b marked on the body 100a. The rotary switch 130a may be configured to input the magnification in the form of an integer, for example, M=−4 (that is, ¼times), −3 (that is, ⅓times), −2 (that is, ½times), 1 (that is, no adjustment of magnification), 2 (that is, 2 times), 3 (that is, 3 times), or 4 (that is, 4 times).

The selection switch 130b may be configured to include a plurality of key buttons (that is, a down key button 130b' and an up key button 130b''), which are disposed on the body 100a of the pen mouse and are used to input magnification M.

The volume switch 130 is magnification M input means that is capable of inputting continuous magnification M based on the center line 100b. For example. the magnification may be set such that it increases when the volume switch 130 is rotated clockwise and decreases when it is rotated counter-clockwise.

The microcomputer 140 calculates input coordinate values (current input coordinate values; in the present specification, the term "input coordinate values" and the term "current input coordinate values" have the same meaning) (X,Y) (a horizontal coordinate value, a vertical coordinate value) based on an electrical signal from the light receiving unit 112.

Furthermore, in the case where the microcomputer 140 receives magnification M from the magnification setting unit 130 (that is, in the case where a user inputs magnification M through the magnification setting unit 130), the microcomputer 140 calculates display coordinate values (coordinate values displayed on the monitor) (X',Y') based on the input coordinate values (X,Y) and the magnification M, converts the calculated displayed coordinate values (X',Y') into a coordinate data code (that is, a step code), and outputs the coordinate data code to the transmission unit 150.

Figure 2:
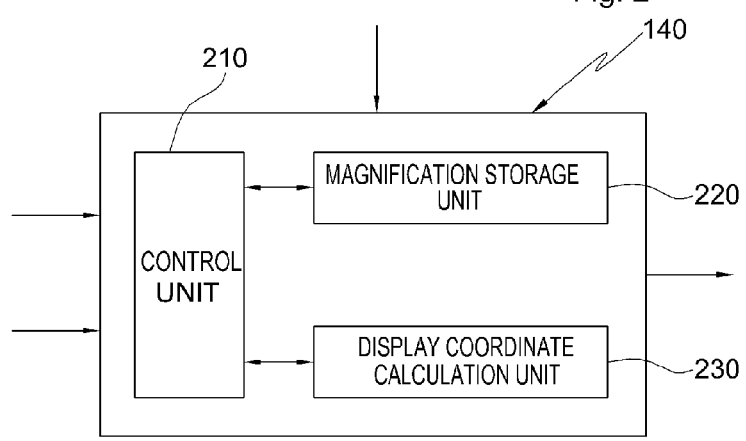
FIG. 2 is a detailed block diagram showing the microcomputer 140 of FIG. 1.

FIG. 2 is a block diagram showing the microcomputer 140 of FIG. 1.

As shown in FIG. 2, the microcomputer 140 according to the embodiment of the present invention includes a control unit 210, a magnification storage unit 220 and a display coordinate calculation unit 230. Furthermore, it will be obvious that the microcomputer 140 is provided with an interface that transmits and receives data.

The control unit 210 calculates input coordinate values (X,Y) based on an electrical signal from the light receiving unit 112, reads the input coordinate values (X,Y) and the display coordinate values (X',Y'), calculated by the display coordinate calculation unit 230, and converts the coordinate values into coordinate data codes.

The control unit 210 controls the magnification storage unit 220 and the display coordinate calculation unit 230.

The magnification storage unit 220 stores the magnification M, input from the magnification setting unit 130, under the control of the control unit 210.

Under the control of the control unit 210, the display coordinate calculation unit 230 calculates display coordinate values (X',Y') based on the addition of remainders, obtained through the division of the input coordinate values $(X_n,Y_n)$ by the magnification M, to subsequent input coordinate values and the division of the resulting values of the addition by the magnification M.

That is, the display coordinate calculation unit 230 adds remainders, obtained through the division of the input coordinate values $(X_n,Y_n)$ by the magnification M, to subsequent input coordinate values $(X_{n+1}, Y_{n+1})$, divides the resulting values of the addition by the magnification M, and sets the quotients of the division as the display coordinate values That is, remainders $(A_n,B_n)$, obtained by dividing nth input coordinate values $(X_n,Y_n)$ by the magnification M, are added to subsequent (n+1)th input coordinate values $(X_{n+1},Y_{n+1})$, addition data $(X_{n+1}+A_n, Y_{n+1}+B_n)$ is divided by the magnification M, and the quotients of the division are set as (n+1)th display coordinate values $(X_{n+1}',Y_{n+1}')$.

Figure 3:
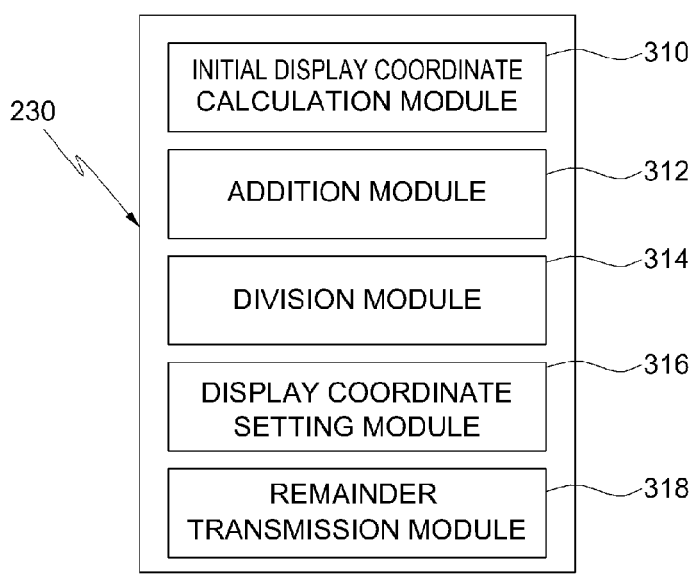
FIG. 3 is a detailed block diagram showing the display coordinate calculation unit of FIG. 2.

FIG. 3 is a detailed block diagram showing the display coordinate calculation unit of FIG. 2.

As shown in FIG. 3, the display coordinate calculation unit 230 includes an initial display coordinate calculation module 310, an addition module 312, a division module 314, a display coordinate setting module 316 and a remainder transmission module 318.

The initial display coordinate calculation module 310 calculates initial display coordinate values $(X_1',Y_1')$ by setting quotients, obtained through the division of the initial input coordinate values $(X_1,Y_1)$ by the magnification M, as the initial display coordinate values $(X_1',Y_1')$.

Meanwhile, the display coordinate values (X',Y'), calculated by the initial display coordinate calculation module 310, are read by the control unit 210, and are converted into a coordinate data code.

The addition module 312 receives first remainders $(A_1,B_1)$ from the initial display coordinate calculation module 310, and adds nth remainders $(A_n,B_n)$, obtained through nth division based on the first remainders $(A_1,B_1)$, to (n+1)th input coordinate values $(X_{n+1},Y_{n+1})$.

The division module 314 divides nth addition data $(X_{n+1}+A_n, Y_{n+1}+B_n)$, obtained through addition by the addition module 312, by the magnification M.

The display coordinate setting module 316 sets quotients, obtained through division by the division module 314, as (n+1)th display coordinate values $(X_{n+1}',Y_{n+1}')$.

The reading of the display coordinate values $(X_{n+1}',Y_{n+1}')$, set by the display coordinate setting module 316, by the control unit 210 is the same as described above.

The remainder transmission module 318 transmits (n+1)th remainders $(A_{n+1},B_{n+1})$. obtained through division by the division module 314, to the addition module 312.

Figure 4:
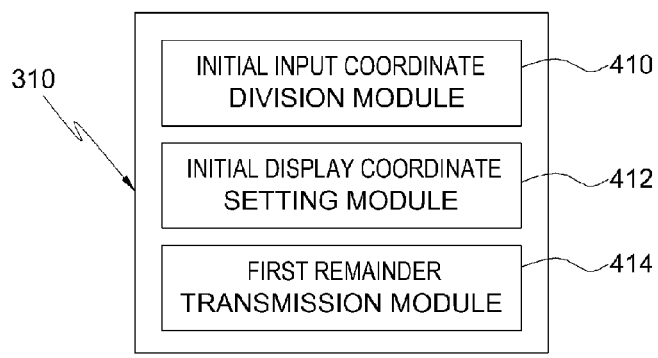
FIG. 4 is a detailed block diagram showing the initial display coordinate calculation module 310 of FIG. 3.

FIG. 4 is a detailed block diagram showing the initial display coordinate calculation module 310 of FIG. 3.

As shown in FIG. 4, the initial display coordinate calculation module 310 includes an initial input coordinate division module 410, an initial display coordinate setting module 412, and a first remainder transmission module 414.

The initial input coordinate division module 410 divides initial input coordinate values $(X_1,Y_1)$ by the magnification M.

The initial display coordinate setting module 412 sets quotients, obtained through first division by the initial input coordinate division module 410, as initial display coordinate values $(X_1',Y_1')$.

The first remainder transmission module 414 transmits the first remainders $(A_1, B_1)$, obtained through first division by the initial input coordinate division module 410, to the addition module 312.

A method of magnifying a displayed object using an optical pen mouse, capable of magnifying a displayed object according to the present invention, which has the above-described construction, will be described below.

Figure 6:
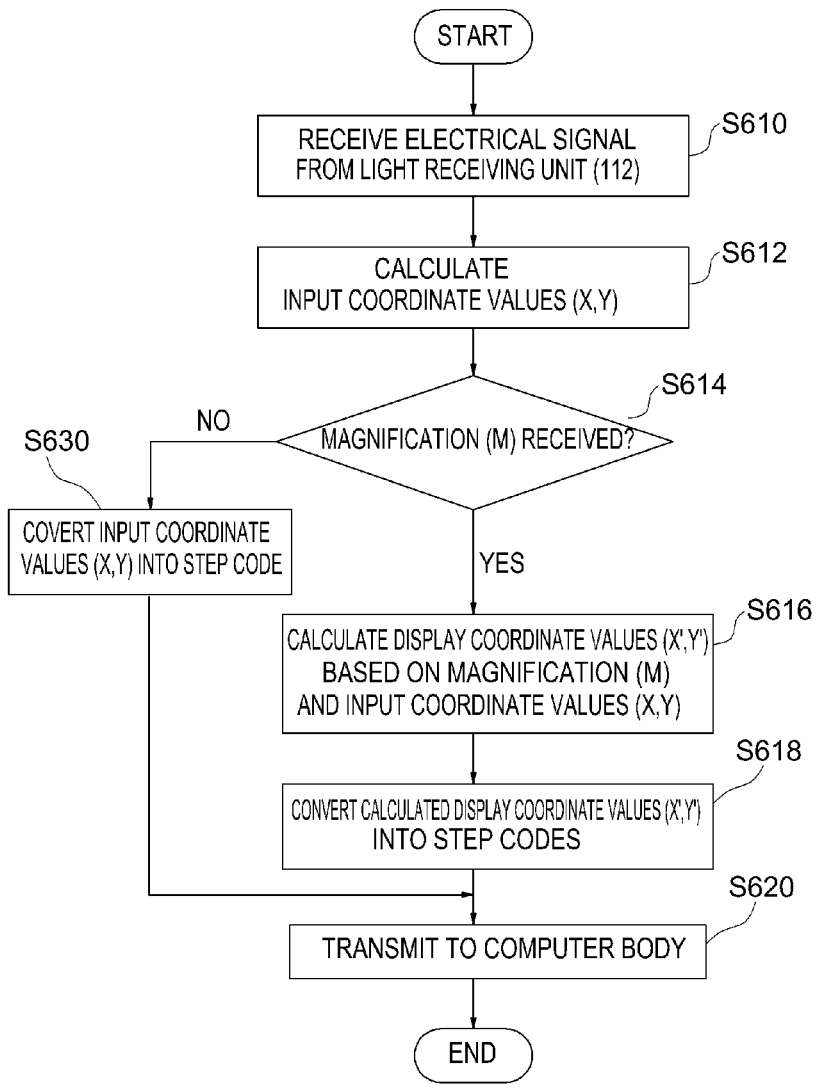
FIG. 6 is a flowchart showing a method of magnifying a displayed object using the optical pen mouse according to an embodiment of the present invention.

FIG. 6 is a flowchart showing a method of magnifying a displayed object using the optical pen mouse according to the embodiment of the present invention.

As shown in FIG. 6, the control unit 210, having received an electrical signal from the light receiving unit 112 at step S610, calculates input coordinate values (X,Y) based on the electrical signal at step S612.

If the control unit 210 has received magnification M from the magnification setting unit 130 (that is, if a user has input magnification M through the magnification setting unit 130 at step S614), the display coordinate calculation unit 230 calculates display coordinate values (X',Y') based on the input coordinate values (X,Y) and the magnification M, under the control of the control unit 210, at step S616.

Furthermore, the control unit 210 reads the display coordinate values (X',Y'), calculated by the display coordinate calculation unit 230, and converts the display coordinate values into a step code at step S618, and transmits the step code of the display coordinate values (X',Y') to a computer body through the transmission unit 150 at step S620.

Meanwhile, if the control unit 210 has not received the magnification M from the magnification setting unit 130 (that is, if a user has not received the magnification M) at step S614, a normal mode, that is, a mode of converting the input coordinate values (X,Y) into a coordinate data code (that is, a step code) at step S630 and outputting the coordinate data code to the computer body through the transmission unit 150 at step S620, is performed, in which case an object 14 is displayed on the monitor 12 without magnification.

Figure 7:
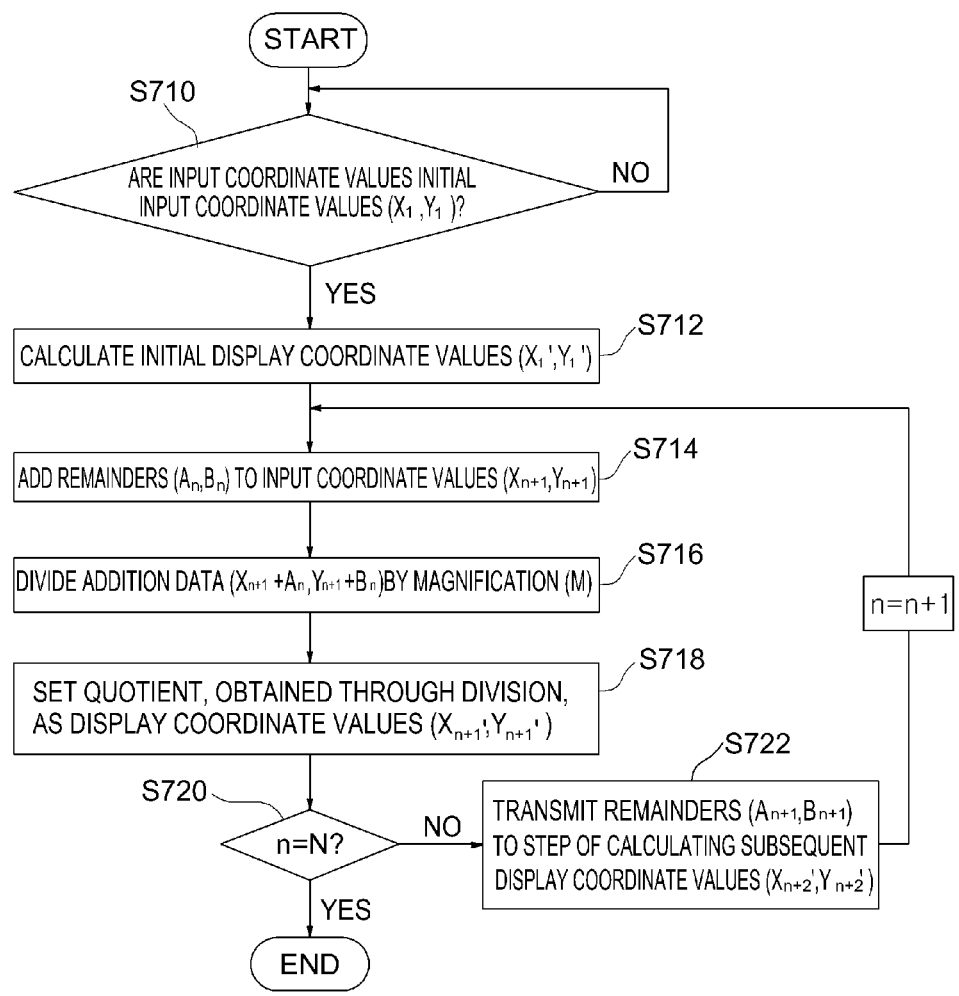
FIG. 7 is a detailed flowchart showing the method of calculating display coordinate values (X',Y') of FIG. 6.
Figure 8:
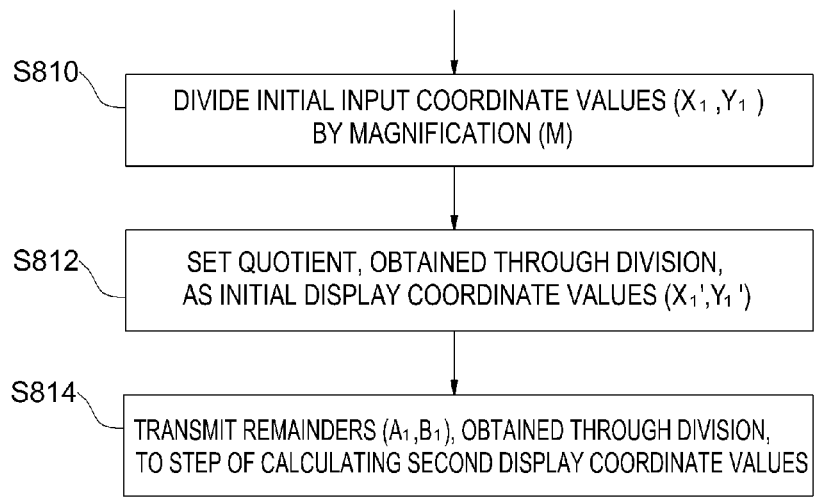
FIG. 8 is a detailed flowchart showing the method of calculating initial display coordinate values (X',Y') of FIG. 7.

Referring to FIGS. 7 and 8, a method of calculating display coordinate values (X',Y') based on input coordinate values (X,Y) and magnification M will be described in greater detail below.

FIG. 7 is a detailed flowchart showing the method of calculating display coordinate values (X',Y') of FIG. 6, and FIG. 8 is a detailed flowchart showing the method of calculating initial display coordinate values ($X_1'$,$Y_1'$) of FIG. 7.

First, it is determined whether input coordinate values are initial input coordinate values ($X_1$,$Y_1$) at step S710, and the initial display coordinate calculation module 310 calculates initial display coordinate values ($X_1'$,$Y_1'$) if the input coordinate values are initial input coordinate values ($X_1'$,$Y_1'$) at step S712.

That is, if the initial input coordinate values ($X_1$,$Y_1$) have been input, the control unit 210 controls the operation of the initial display coordinate calculation module 310 so that the initial display coordinate calculation module 310 calculates the initial display coordinate values ($X_1'$,$Y_1'$).

In greater detail, the initial input coordinate division module 410 divides the initial input coordinate values ($X_1$,$Y_1$) by the magnification M at step S810, the initial display coordinate setting module 412 sets quotients, obtained through the division, as initial display coordinate values ($X_1'$,$Y_1'$) at step S812, and the first remainder transmission module 414 transmits remainders ($A_1$,$B_1$), obtained through the division, to the step of calculating second display coordinate values ($X_2'$,$Y_2'$) at step S814.

The initial display coordinate values ($X_1'$,$Y_1'$), calculated through the above-described process, are read by the control unit 210, are converted into a coordinate data code, and are transmitted to the computer body.

After calculating the initial display coordinate values ($X_1'$,$Y_1'$), the addition module 310 adds the remainders ($A_n$,$B_n$), obtained through the calculation of the initial display coordinate values ($X_1'$,$Y_1'$), to the input coordinate values ($X_{n+1}$,$Y_{n+1}$) at step S714.

The division module 314 divides addition data ($X_{n+1}+A_n$, $Y_{n+1}+A_n$), obtained through the addition, by the magnification M at step S716.

The display coordinate setting module 316 sets quotients, obtained through the division, as display coordinate values ($X_{n+1}'$,$Y_{n+1}'$) at step S718. The obtained display coordinate values ($X_{n+1}'$,$Y_{n+1}'$) are read by the control unit 210, and are converted into a coordinate data code.

The control unit 210 determines whether n has reached N (the last coordinate value) at step S720. If n has not reached N, the remainder transmission module 318 transmits the remainders ($A_{n+1}$,$B_{n+1}$), obtained through the division, to the addition step S714 at step S722, and repeats steps S714 and S718 until n reaches N.

Meanwhile, if n has reached N, the control unit 210 controls the remainder transmission module 318 so that the remainder transmission module 318 does not transmit remainders anymore.

The process of calculating the display coordinate values (X',Y') will be described in greater detail below with an X coordinate value taken as an example.

First, an initial display coordinate value X' is calculated as described below:

$$X/M = \text{first quotient } P_1 + \text{first remainder } A_1 \quad (1)$$

In Equation 1, the first quotient $P_1$ is set as the initial display coordinate value $X_1'$. The obtained initial display coordinate value $X_1'$ is read by the control unit 210.

Thereafter, a second display coordinate value X' is calculated as described below:

$$(\text{first remainder } A_1 + X_2)/M = \text{second quotient } P_2 + \text{second remainder } A_1 \quad (2)$$

In Equation 2, the second quotient $P_2$ is set as the second display coordinate value $X_2'$. The obtained display coordinate value $X_2'$ is read by the control unit 210, and is converted into a coordinate data code.

Thereafter, a third display coordinate value $X_3'$ is calculated as described below:

$$(\text{second remainder } A_2 + X_3)/M = \text{third quotient } P_3 + \text{third remainder } A_3 \quad (3)$$

In Equation 3, the third quotient $P_3$ is set as the third display coordinate $X_3'$. The obtained display coordinate value $X_3'$ is read by the control unit 210, and is converted into a coordinate data code.

Thereafter, an nth display coordinate value $X_n'$ is calculated as described below:

$$((n-1)\text{th remainder } A_{n-1} + X_n)/M = \text{nth quotient } P_n + \text{nth remainder } A_n \quad (n)$$

In Equation n, the nth quotient $P_n$ is set as the nth display coordinate value $X_n'$. The obtained display coordinate value $X_n'$ is read by the control unit 210, and is converted into a coordinate data code.

Meanwhile, until n has reached N (the last coordinate number), the display coordinate values are calculated.

That is, if n=N, $$((N-1)\text{th remainder } A_{N-1} + X_N)/M = N\text{th quotient } P_N + N\text{th remainder } A_N \quad (N)$$

In Equation N, the Nth quotient $P_N$ is set as the display coordinate $X_N'$ of the last coordinate value. The obtained display coordinate value $X_N'$ is read by the control unit 210, and is converted into a coordinate data code.

As a result of the calculation, the display coordinate values $X_1'$, $X_2'$, $X_3'$, ..., $X_n'$, ... and $X_N'$ are obtained.

It is obvious that a Y coordinate value can be calculated in the same manner as the X coordinate value.

The reason for the above-described algorithm for calculating the display coordinate values (X',Y') is to correct error attributable to the generation of a decimal point resulting from the division by the magnification M. For example, when $X_n$ is converted into $X_n'$, the sum of all errors is (n+1)th remainders ($A_{n+1}, B_{n+1}$), so error can be minimized by including the sum as a correction value through the display coordinate calculation.

The above-described embodiments of the present invention are only embodiments of the technical spirit of the present invention, and it will be apparent to those skilled in the art that other modifications can be made within the scope of the technical spirit of the present invention.

The invention claimed is:

1. An optical pen mouse capable of magnifying a displayed object, comprising: a magnification setting unit a configured to receive an input magnification (M) to adjust a size of an object to be displayed on a monitor of a computer; and a microcomputer configured to calculate input coordinate values (X,Y) including a horizontal coordinate value and a vertical coordinate value based on an electrical signal from the light receiving unit and, when the magnification (M) is received from the magnification setting unit (130), to calculate display coordinate values (X',Y') based on the input coordinate values (X,Y) and the magnification (M), to convert the calculated display coordinate values (X',Y') into a coordinate data code and to output the coordinate data code; wherein the microcomputer comprises: a control unit configured to calculate current coordinate values (X,Y) based on an electrical signal from the light receiving unit, and to convert the current coordinate values (X,Y) and the display coordinate values (X',Y') into coordinate data codes; a magnification storage unit configured to store the magnification (M), received from the magnification setting unit under control of the control unit; and a display coordinate calculation unit configured to calculate the display coordinate values (X',Y') based on addition of remainders, obtained through division of the input coordinate values ($X_n, Y_n$) by the magnification (M), to subsequent input coordinate values ($X_{n+1}, Y_{n+1}$) and division of values resulting from the addition by the magnification (M).

2. The optical pen mouse as set forth in claim 1, wherein the display coordinate calculation unit (230) is configured to add the remainders; to the subsequent input coordinate values ($X_{n+1}, Y_{n+1}$), to divide resulting values of the addition by the magnification (M), and to set sets quotients of the division as display coordinate values ($X_{n+1}', Y_{n+1}'$); wherein n is a natural number equal to or greater than one.

3. The optical pen mouse as set forth in claim 2, wherein the display coordinate calculation unit comprises:
an initial display coordinate calculation module configured to calculate initial display coordinate values ($X_1', Y_1'$) by setting quotients, obtained by dividing initial input coordinate values ($X_1, Y_1$) by the magnification M, as the initial display coordinate values ($X_1', Y_1'$);
an addition module configured to receive first remainders ($A_1, B_1$) from the initial display coordinate calculation module and to add remainders ($A_n, B_n$), obtained through the division, to the input coordinate values ($X_{n+1}, Y_{n+1}$);
a division module configured to divide addition data ($X_{n+1}+A_n, Y_{n+1}+B_n$), obtained through the addition performed by the addition module, by the magnification (M);
a display coordinate setting module configured to set quotients, obtained through the division performed by the division module, as the display coordinate values ($X_{n+1}', Y_{n+1}'$); and
a remainder transmission module configured to transmit remainders ($A_{n+1}, B_{n+1}$), obtained through the division performed by the division module, to the addition module.

4. The optical pen mouse as set forth in claim 3, wherein the initial display coordinate calculation module comprises:
an initial input coordinate division module configured to divide the initial input coordinate values ($X_1, Y_1$) by the magnification (M);
an initial display coordinate setting module configured to set the quotients, obtained through the division performed by the initial input coordinate division module, as the initial display coordinate values ($X_1', Y_1'$); and
a first remainder transmission module configured to transmit the first remainders ($A_1, B_1$), obtained through the division performed by the initial input coordinate division module, to the addition module.

5. The optical pen mouse as set forth in any one of claims 1 to 4, wherein the magnification setting unit is implemented using any one of a rotary switch, a selection switch and a volume switch, which is mounted in a body of the pen mouse and inputs the magnification (M).

6. A method of magnifying a displayed object using an optical pen mouse, comprising: a step of calculating input coordinate values (X,Y) based on a received electrical signal; a step of determining whether magnification (M) has been received from a magnification setting unit; a step of, if the magnification M has been received, calculating display coordinate values (X',Y') based on the input coordinate values (X,Y) and the magnification (M); a step of converting the calculated display coordinate values (X',Y') into a step code; and a step of transmitting the step code of the display coordinate values (X',Y') to a computer body through a transmission unit; the step of calculating calculation of the display coordinate values (X',Y') includes adding remainders, obtained through division of the input coordinate values ($X_n, Y_n$) by the magnification (M), to subsequent input coordinate values ($X_{n+1}, Y_{n+1}$) and dividing a resulting value by the magnification (M).

7. The method as set forth in claim 6, further comprising a step of converting the input coordinate values (X,Y) into a step code if, as a result of the step step of determining, the magnification (M) has not been received.

8. The method as set forth in claim 6, wherein the step of calculating the display coordinate values (X',Y') comprises: a step of determining whether the input coordinate values are initial input coordinate values (X1, Y1); a step of, if the input coordinate values are initial input coordinate values (X1, Y1), calculating initial display coordinate values (X1, Y1); a step of adding remainders ($A_n, B_n$), obtained through calculation by the initial display coordinate values (X1', Y1'), to the obtained input coordinate values ($X_{n+1}, Y_{n+1}$); a step of dividing addition data ($X_{n+1}+A_n, Y_{n+1}+B_n$), obtained by the step of adding the remainders to the obtained input coordinate values, by the magnification (M); a step of setting quotients, obtained through the division, as the display coordinate values ($X_{n+1}', Y_{n+1}'$); a step of determining whether n has reached N, wherein N is a last coordinate number; and a step of, if n has reached N, transmitting remainders ($A_{n+1}, B_{n+1}$), obtained through the division, to the addition step and repeating the steps of adding the remainders, dividing the addition data and setting the quotients until n has reached N.

9. The method as set forth in claim 8, wherein the step of calculating the initial display coordinate values ($X_1', Y_1'$) comprises:
a step of dividing the initial input coordinate values ($X_1, Y_1$) by the magnification (M);
a step of setting quotients, obtained through the division, as the initial display coordinate values ($X_1', Y_1'$); and a step of transmitting remainders ($A_1$, $B_1$), obtained through the division, to a step of calculating second display coordinate values ($X_2'$, $Y_2'$).

* * * * *